United States Patent
Carmona et al.

(10) Patent No.: US 8,850,159 B2
(45) Date of Patent: Sep. 30, 2014

(54) METHOD AND SYSTEM FOR LATENCY OPTIMIZED ATS USAGE

(75) Inventors: Jacob Carmona, Hod HaSharon (IL); Eliezer Aloni, Zur Yigal (IL); Yuval Eliyahu, Petach Tiqva (IL); Rafi Shalom, Givat Schmuel (IL)

(73) Assignee: Broadcom Corporation, Irvine, CA (US)

( * ) Notice: Subject to any disclaimer, the term of this patent is extended or adjusted under 35 U.S.C. 154(b) by 1433 days.

(21) Appl. No.: 12/111,608

(22) Filed: Apr. 29, 2008

(65) Prior Publication Data

US 2009/0271590 A1    Oct. 29, 2009

(51) Int. Cl.
*G06F 12/10* (2006.01)
*G06F 13/12* (2006.01)

(52) U.S. Cl.
CPC .......... *G06F 12/1072* (2013.01); *G06F 13/126* (2013.01); *G06F 2212/657* (2013.01); *G06F 12/1081* (2013.01); *G06F 2213/0026* (2013.01)
USPC .............................. 711/207; 711/221; 710/26

(58) Field of Classification Search
USPC .................................. 711/207, 221; 710/26
See application file for complete search history.

(56) References Cited

U.S. PATENT DOCUMENTS

| | | | | |
|---|---|---|---|---|
| 5,835,928 A | * | 11/1998 | Auslander et al. | 711/3 |
| 5,953,748 A | * | 9/1999 | Riordan | 711/207 |
| 2002/0152344 A1 | * | 10/2002 | Holm et al. | 710/260 |
| 2008/0120487 A1 | * | 5/2008 | Saripalli | 711/206 |
| 2008/0189720 A1 | * | 8/2008 | Moertl et al. | 719/314 |

OTHER PUBLICATIONS

Andrew S. Tanenbaum, Modern Operating Systems, 2001, Prentice-Hall, Inc., second edition, pp. 207-209.*

* cited by examiner

*Primary Examiner* — Jared Rutz
(74) *Attorney, Agent, or Firm* — Oblon, Spivak, McClelland, Maier & Neustadt, L.L.P.

(57) ABSTRACT

Methods and systems for latency optimized ATS usage are disclosed. Aspects of one method may include communicating a memory access request using an untranslated address and also an address translation request using the same untranslated address, where the translation request may be sent without waiting for a result of the memory access request. The memory access request and the address translation request may be made in either order. A translation agent may be used to translate the untranslated address, and the translated address may be communicated to the device that made the memory access request. The translated address may also be used to make the memory access. Accordingly, by communicating the translated address without having to wait for completion of the memory access, or vice versa, the requesting device may reduce latency for memory accesses when using untranslated addresses.

28 Claims, 4 Drawing Sheets

METHOD AND SYSTEM FOR LATENCY OPTIMIZED ATS USAGE

CROSS-REFERENCE TO RELATED APPLICATIONS/INCORPORATION BY REFERENCE

[Not Applicable.]

FEDERALLY SPONSORED RESEARCH OR DEVELOPMENT

[Not Applicable]

MICROFICHE/COPYRIGHT REFERENCE

[Not Applicable]

FIELD OF THE INVENTION

Certain embodiments of the invention relate to processing data. More specifically, certain embodiments of the invention relate to a method and system for latency optimized address translation system (ATS) usage.

BACKGROUND OF THE INVENTION

Many modern electronic systems have memory architecture that may comprise physical memory and logical memory. For example, when addressing memory, a processor may reference a memory address, which may result in a cache hit if the memory address is associated with a cache. However, a miss can result in delay while the data associated with the memory address is fetched from another memory device, such as another level of cache, main memory, or a mass storage device.

Other memory architectures may use translation of addresses in order to access physical memory devices. For example, a processor may request data access using a virtual address that may need to be translated to a physical address. The virtual address may then be translated to a physical address before the physical memory can be accessed.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method for latency optimized ATS usage, substantially as shown in and/or described in connection with at least one of the figures, as set forth more completely in the claims.

Various advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for latency optimized ATS usage. Aspects of the invention may comprise communicating a memory access request using an untranslated address and also an address translation request using the same untranslated address, where the memory access request may be sent without waiting for a result of the address translation request. The memory access request and the address translation request may be made in either order.

A translation agent in an address translation system may be used to translate the untranslated address, and the translated address may be communicated to the device that made the address translation request. The translated address may also be used to make the memory access. Accordingly, by initiating the memory access request without having to wait for the communication of the translated address, or vice versa, the requesting device may reduce latency for memory accesses when using untranslated addresses. An untranslated address may also be referred to as a virtual address, and a translated address may be referred to as a physical address.

Figure 1:
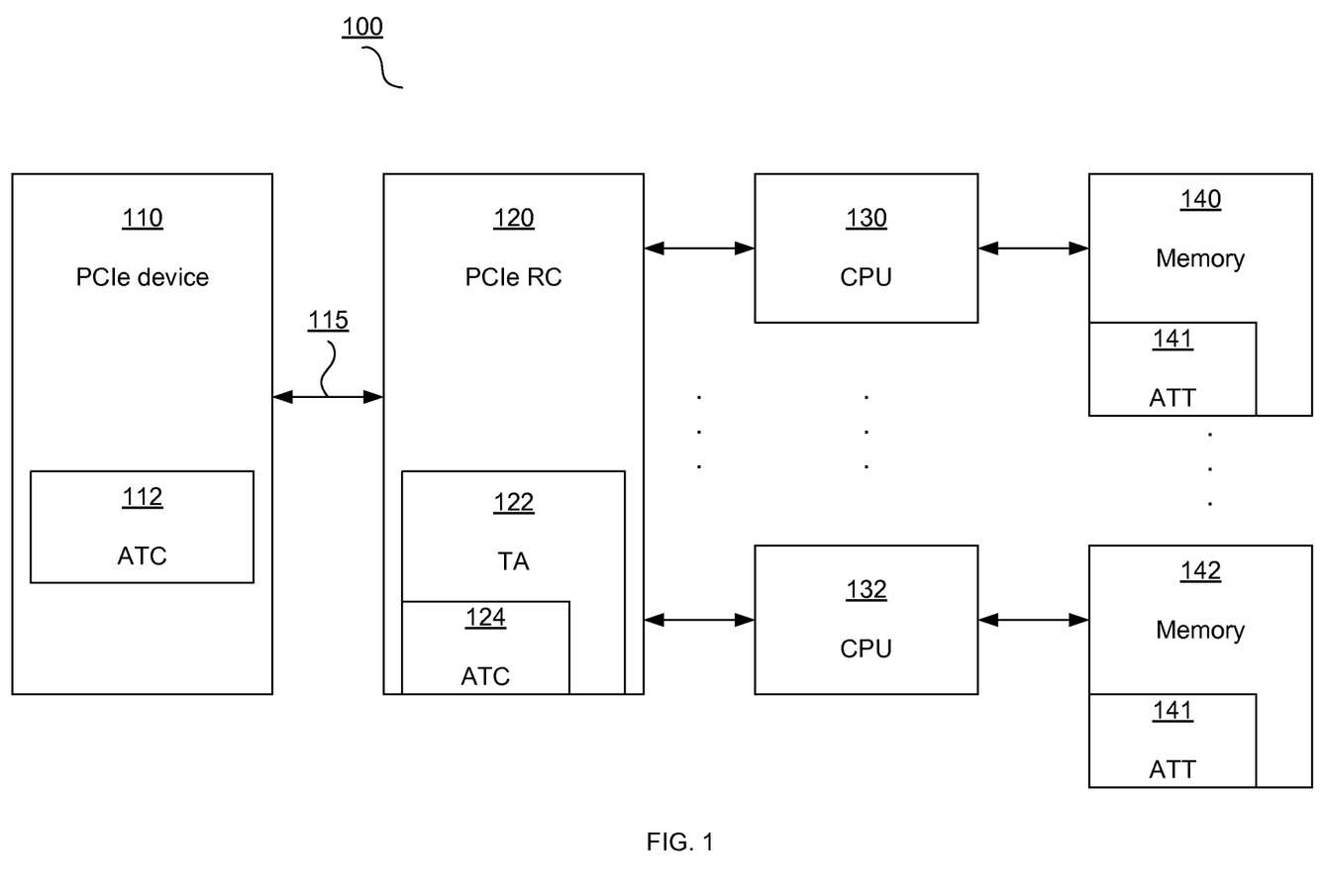
FIG. 1 is a block diagram of an exemplary system for accessing memory, in accordance with an embodiment of the invention.

FIG. 1 is a block diagram of an exemplary system for accessing memory, in accordance with an embodiment of the invention. Referring to FIG. 1, there is shown an electronic system 100 that may comprise communication via, for example, a PCI Express (PCIe) bus 115. The electronic system 100 may comprise a PCI device 110, a PCIe root complex 120, a plurality of processors 130 . . . 132, and a plurality of memory devices 140 . . . 142.

The PCIe device 110 may comprise suitable logic, circuitry, and/or code that may enable issuing of PCIe read and write requests to the PCIe RC 120 via a PCIe bus 115. In instances when the PCI device 110 supports address translation, the PCIe device 110 may comprise an address translation cache 112 that may enable storage of translated addresses.

The PCIe root complex 120 may comprise suitable logic, circuitry, and/or code that may enable processing of DMA requests, for example, from the PCIe device 110 to one or more of the plurality of memory devices 140 . . . 142. The PCIe root complex 120 may also comprise the translation agent 122, which may enable providing translated addresses to a device, such as, for example, the PCIe device 110, that requests address translation. The translation agent 122, while shown as being internal to the PCIe root complex 120, may also be external to the PCIe root complex 120.

The translation agent 122 may comprise suitable logic, circuitry, and/or code that may enable translation of virtual addresses to physical addresses. The address translation request may be made, for example, by the PCIe device 110 in instances when a DMA transfer may be desired. The translation agent 122 may also comprise, for example, a cache such as the address translation cache 124 for storing translated addresses.

The processors 130 . . . 132 may each have associated with it one of the memory devices 140 . . . 142. Each of the memory devices 140 . . . 142 may comprise, for example, a volatile or non-volatile memory type. Accordingly, each processor 130 . . . 132 may control access to a corresponding one of the memory devices 140 . . . 142.

In operation, the PCIe device 110 may need to perform a DMA transfer to one of the memory devices 140 . . . 142. A DMA transfer may be performed using, for example, physical addresses for the memory devices 140 . . . 142. Accordingly, the PCIe device 110 may search in the address translation cache 112 for a translation of virtual addresses, where the translated addresses may be physical addresses for the memory devices 140 . . . 142. If the physical addresses are found in the address translation cache 112, the PCIe device 110 may issue a DMA request to the PCIe root complex 120 with the physical addresses. The PCIe root complex 120 may then commence DMA transfer by communicating with the appropriate processor 130 . . . 132 to access data in the associated memory device 140 . . . 142.

If there are no physical addresses that correspond to the virtual addresses, the PCIe device 110 may issue a DMA request using the virtual addresses. The PCIe root complex 120 may then translate the virtual addresses to physical addresses in order to start a DMA transfer process. The translation process may comprise, for example, communicating the virtual addresses to the translation agent 122. The translation agent 122 may determine whether the translation is possible via entries in the address translation cache 124. If so, the translation process may be finished. If the address translation cache 124 does not have the translation for the virtual address, the translation agent 122 may access, for example, an address translation table 141 that may be stored in one or more of the memory devices 140 . . . 142. The resulting translated addresses may then be used by the PCIe RC 120 to perform DMA transfers as requested by the PCIe device 110.

Although a specific PCI architecture may have been described with respect to FIG. 1, other embodiments may also be used. For example, the address translation table 141 may be in a part of memory that may be directly accessible to the PCIe root complex 120 and/or the translation agent 122.

Figure 2:
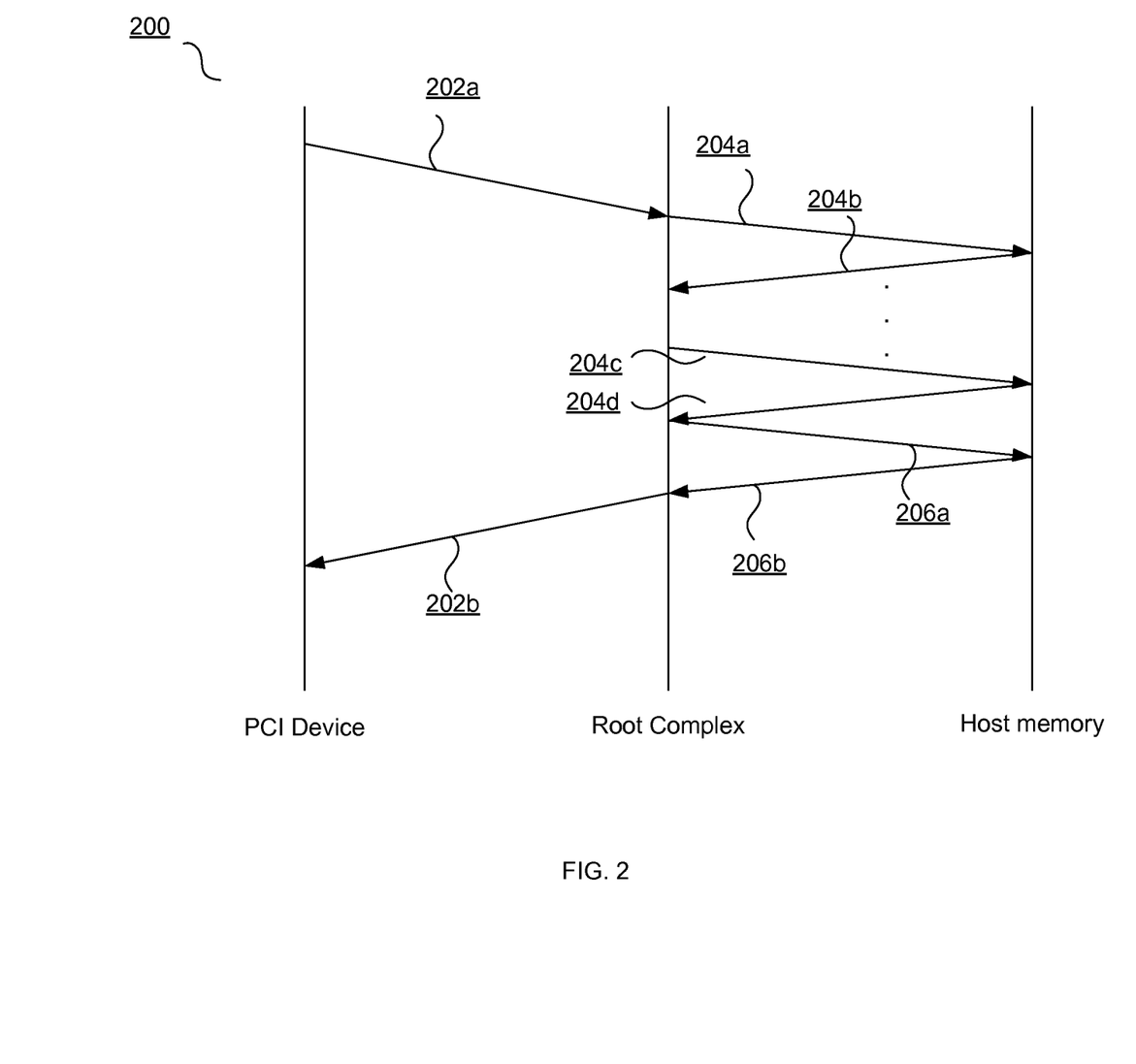
FIG. 2 is a flow diagram illustrating exemplary memory accesses using untranslated addresses, which may be utilized in connection with an embodiment of the invention.
Figure 3:
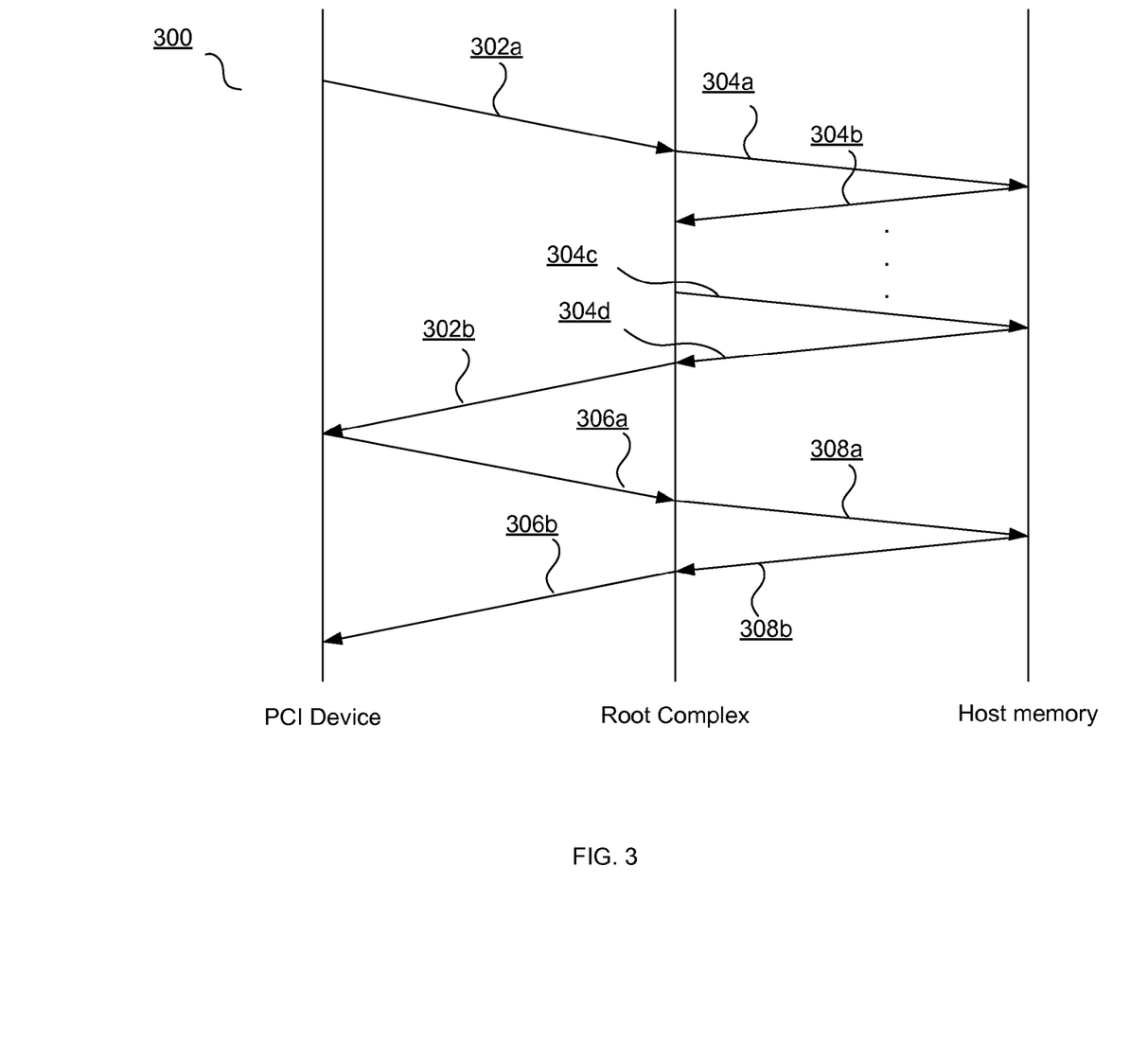
FIG. 3 is a flow diagram illustrating exemplary memory accesses using translated addresses, which may be utilized in connection with an embodiment of the invention.
Figure 4:
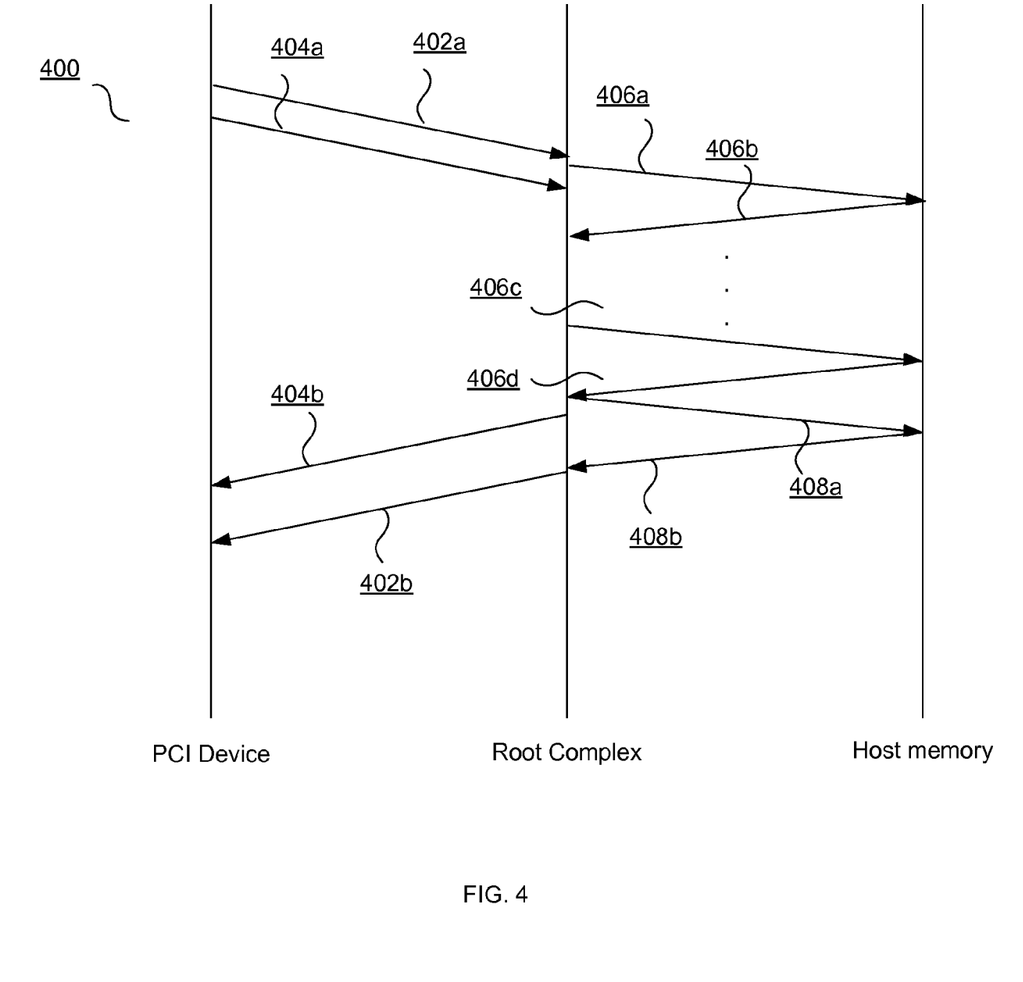
FIG. 4 is a flow diagram illustrating exemplary memory accesses using translated addresses, in accordance with an embodiment of the invention.

FIGS. 2-4 will illustrate exemplary DMA transfer requests by the PCIe device 110.

FIG. 2 is a flow diagram illustrating exemplary memory accesses using untranslated addresses, which may be utilized in connection with an embodiment of the invention. Referring to FIG. 2, there is shown a memory access flow diagram 200. The PCIe device 110 may send, for example, a memory access request 202*a* to the PCIe root complex 120. The memory access request 202*a* may be made using, for example, an untranslated virtual address if a translated address is not available in the address data cache 112.

Accordingly, the translation agent 122 in the PCIe root complex 120 may start the process of translating the virtual address from the PCIe device 110. The translation process may comprise determining whether the translated address is available in, for example, the address translation cache 124. If the translated address is not available in the address translation cache 124, the translation agent 122 may access the address translation table 141 via a read request 204*a*.

Accordingly, the PCIe root complex 120 may access the address translation table 141 in one or more of the memory devices 140 . . . 142. There may be a series of memory read requests and responses 204*a* . . . 204*d* to and from the address translation table 141, depending on the number of levels in the address translation table 141. For example, if the address translation table 141 comprises N levels, the translation agent 122 may request N reads from the address translation table 141, where each successive read request may use information from the previous read request.

After the virtual address has been translated by the translation agent 122, the PCIe root complex 120 may make a memory access request 206*a* to the appropriate memory device 140 . . . 142 using the translated address via the appropriate processor 130 . . . 132. If the memory access request 202*a* was a read request, the memory device 140 . . . 142 may respond with the requested data via the appropriate processor 130 . . . 132 in the response 206*b*. The PCIe root complex 120 may then communicate the requested data to the PCIe device 110 in the response 202*b*. If the memory access request 202*a* was a write request, the responses 206*b* and 202*b* may not be needed.

In this memory access scheme described, the PCIe 120 does not communicate the translated address to the requesting PCIe device 110. Accordingly, when using an untranslated address for memory accesses, the PCIe device 110 may incur an overhead for the translation process by the PCIe root complex 120 for each memory access.

The translation overhead may be expressed as:

$$\text{Latency} = (N+1)*T_m + T_p. \quad (1)$$

N may be the number of read operations needed for the translation by the translation agent 122. $T_m$ may be the latency of read operation from the PCIe root complex 120 to the memory devices 140 . . . 142. $T_p$ may be the round-trip time from a memory request sent by the PCIe device 110 to when a response is received from the PCIe root complex 120. $T_p$ may be exclusive of the PCIe root complex 120 to memory devices 140 . . . 142 latency.

FIG. 3 is a flow diagram illustrating exemplary memory accesses using translated addresses, which may be utilized in connection with an embodiment of the invention. Referring to FIG. 3, there is shown a memory access flow diagram 300. If a translated address is not available in the address data cache 112, the PCIe device 110 may send, for example, a translate request 302*a* to the PCIe root complex 120.

The PCIe root complex 120 may receive the translate request 302*a* and communicate the translate request 302*a* from the PCIe device 110 to the translation agent 122. The translation process may first comprise determining whether the translated address is available in, for example, the address translation cache 124. If the translated address is not available in the address translation cache 124, the translation agent 122 may access the address translation table 141 via a read request 304*a*.

Accordingly, the PCIe root complex 120 may access the address translation table 141 in one or more of the memory devices 140 . . . 142. There may be a series of memory read requests and responses 304*a* . . . 304*d* to and from the address translation table 141, depending on the number of levels in the address translation table 141. For example, if the address translation table 141 comprises N levels, the translation agent 122 may request N reads from the address translation table 141, where each successive read request may use information from the previous read request.

After the virtual address has been translated by the translation agent 122, the PCIe root complex 120 may communicate the translated address to the PCIe device 110 in the response 302*b*. The translated address may be stored in the address translation cache 112 by the PCIe device 110 for future use. The PCIe device 110 may also make a memory access request 306*a* to the PCIe root complex 120 using the translated address. The PCIe root complex 120 may then use the translated address from the PCIe device 110 to make a memory access request 308a to the appropriate memory device 140 . . . 142 via the appropriate processor 130 . . . 132.

If the memory access request 306a was a read request, the memory device 140 . . . 142 may respond with the requested data via the appropriate processor 130 . . . 132 in the response 308b. The PCIe root complex 120 may then communicate the requested data to the PCIe device 110 in the response 306b. If the memory access request 306a was a write request, the responses 308b and 306b may not be needed.

In this instance, the requesting PCIe device 110 requested a separate translation prior to making a read request with the translated address. Accordingly, when using a translated request for an address before making a memory access, the PCIe device 110 may incur an overhead for the translation process by the PCIe root complex 120.

The translation overhead may be expressed as:

$$\text{Latency} = (N+1)*T_m + 2*T_p. \quad (2)$$

N may be the number of read operations needed for the translation by the translation agent 122. $T_m$ may be the latency of read operation from the PCIe root complex 120 to the memory devices 140 . . . 142. $T_p$ may be the round-trip time from a memory request sent by the PCIe device 110 to when a response is received from the PCIe root complex 120. $T_p$ may be exclusive of the PCIe root complex 120 to memory devices 140 . . . 142 latency.

Accordingly, it can be seen by comparing the latencies described by Equation (1) and Equation (2), that there is an additional latency of $T_p$ for the scenario described with respect to FIG. 3 than there is for the scenario described with respect to FIG. 2. This is due to the need for separate translation request and memory access request with the translated address for the scenario described with respect to FIG. 3. Hence, it can be seen that the use of address translation service prior to memory access may save PCI bus and memory bandwidth for high cache hit ratios. However, a penalty of an additional latency may be imposed when there are cache misses. Accordingly, for DMA transfers to uncached addresses, additionally latency may be present for each data transfer.

FIG. 4 is a flow diagram illustrating exemplary memory accesses using translated addresses, in accordance with an embodiment of the invention. Referring to FIG. 4, there is shown a memory access flow diagram 400. The PCIe device 110 may send, for example, a memory access request 402a to the PCIe root complex 120. The memory access request 402a may be made using, for example, an untranslated virtual address if a translated address is not available in the address data cache 112. After the PCIe device 110 makes the memory access request 402a, the PCIe request may also make a translation request 404a to the PCIe root complex 120. The translation request 404a may be made, for example, without waiting for a response to the memory access request 402a.

The PCIe root complex 120 may receive an untranslated address memory access request 402a, and may communicate the untranslated address from the PCIe device 110 to the translation agent 122. The translation process by the translation agent 122 may comprise determining whether the translated address is available in, for example, the address translation cache 124. If the translated address is not available in the address translation cache 124, the translation agent 122 may access the address translation table 141 via a read request 406a.

Additionally, the translation agent 122 may also determine whether the address that is being requested to be translated may be in the process of being translated. This may occur, for example, in instances when the memory access request 402a using an untranslated address is received from the PCIe device 110. The untranslated address may be in the process of being translated when translation request 404a for the same untranslated address is received from the PCIe device 110.

Similarly, the address translation request 404a may be received first, and then the untranslated address memory access 402a may be made. In either case, if the address translation cache 124 does not contain the translated address, the translation agent 122 may need to determine whether the translation required for the later received request is being made due to a previous request.

Accordingly, the PCIe root complex 120 may access the address translation table 141 in one or more of the memory devices 140 . . . 142. There may be a series of memory read requests and responses 406a . . . 406d to and from the address translation table 141, depending on the number of levels in the address translation table 141. For example, if the address translation table 141 comprises N levels, the translation agent 122 may request N reads from the address translation table 141, where each successive read request may use information from the previous read request.

The PCIe root complex 120 may then make a memory access request 408a using the translated address to the appropriate memory device 140 . . . 142 via the appropriate processor 130 . . . 132. Since the PCIe root complex 120 also received the translation request 404a from the PCIe device 110, the PCIe root complex 120 may communicate the translated address to the PCIe device 110 in the response 404b after the virtual address has been translated by the translation agent 122. The translated address may be stored in the address translation cache 112 by the PCIe device 110 for future use.

If the memory access request 402a was a read request, the memory device 140 . . . 142 may respond with the requested data via the appropriate processor 130 . . . 132 in the response 408b. The PCIe root complex 120 may then communicate the requested data to the PCIe device 110 in the response 402b. If the memory access request 402a was a write request, the responses 408b and 402b may not be needed.

In this scenario described with respect to FIG. 4, the PCIe device 110 may have requested an untranslated memory read request without waiting for a response to an address translation request for the same address. Accordingly, this parallel step (using any order between the memory read request and the address translation request) may make the latency the same as the latency described by Equation 1) while still receiving a translated address for storage in the address translation cache 112.

Accordingly, an embodiment of the invention described with respect to FIG. 4 may allow the PCIe device 110 to make a memory access to a memory device 140 . . . 142 with an untranslated address, while still receiving a translated address for future use without additional latency. Various embodiments of the invention may be used for single accesses to the memory device 140 . . . 142, or a series of accesses such as during a DMA access.

In accordance with an embodiment of the invention, aspects of an exemplary system may comprise the PCIe device 110 that may communicate an untranslated address in a memory access request, which may be a read request or a write request. The PCIe device 110 may also communicate an address translation request for the untranslated address along with the memory access request. The memory access request and the corresponding address translation request may be made with the memory access request first or with the address translation request first.

Upon receiving the untranslated address memory access request or the address translation request for an untranslated address, the PCIe root complex may determine whether a corresponding translated address for the untranslated address may be resident in the address translation cache 122. If so, the translated address may be sent to the PCIe device 110. The PCIe device 110 may then receive a translated address that may correspond to the untranslated address, where the translated address may be saved, for example, in the address translation cache 112 for future use. The translated address may also be used for accessing one of the memory devices 140 . . . 142.

Otherwise, the translation agent 122 may determine whether a translation is in progress for the untranslated address. If an address translation is not in progress for that untranslated address, then address translation process may be initiated for that untranslated address. However, if an address translation is in progress for that untranslated address, then a second address translation may not be initiated since that would duplicate the first address translation.

If the memory access was a read request, then the memory device 140 . . . 142 may return data that may correspond to the untranslated address in the memory access request from the PCIe device 110. This data may be received by the PCIe root complex 120, and the PCIe root complex 120 may communicate the received data to the PCIe device 110.

Another embodiment of the invention may provide a machine-readable storage, having stored thereon, a computer program having at least one code section executable by a machine, thereby causing the machine to perform the steps as described herein for latency optimized ATS usage.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will comprise all embodiments falling within the scope of the appended claims.

What is claimed is:

1. A method for accessing data, the method comprising:
communicating, by a PCI device to a PCI root complex, a memory access request including an untranslated address;
communicating, by the PCI device to the PCI root complex, after the memory access request, an address translation request to translate the untranslated address;
requesting, by the PCI root complex to an address translation table stored in a host memory, a translated address that corresponds to the untranslated address;
receiving, by the PCI root complex from the address translation table, the translated address; and
providing, by the PCI root complex to the PCI device, the translated address in response to the address translation request.

2. The method according to claim 1, further comprising receiving, by the PCI device, data in response to the memory access request, the data from a translated address that corresponds to said untranslated address.

3. The method according to claim 1, further comprising transmitting another memory access request to the address translation table, the another memory access request including the translated address.

4. The method according to claim 3, wherein the address translation request is communicated before the transmission of the another memory access request.

5. The method according to claim 3, wherein said memory access request is a read request and the method further comprises receiving data, from the address translation table, fulfilling the another memory access request and communicating said received data as a response to said direct memory access request.

6. The method of claim 1, further comprising issuing, by the PCI root complex one or more read requests to the host memory.

7. The method of claim 1, wherein
the address translation table in the host memory comprises a plurality of levels, and
the method further comprising issuing, by the PCI root complex a series of read requests to the host memory, each of the series of read requests corresponding to one of the levels.

8. The method of claim 7, wherein each of the series of read requests, after a first read request of the series of read requests, uses information from a previous one of the read requests.

9. The method of claim 1, wherein
the PCI root complex includes an address translation cache, and
the method further comprising determining, by the PCI root complex, whether the translated address corresponding with the untranslated address is stored within the address translation cache of the PCI root complex.

10. The method of claim 9, further comprising
providing the translated address stored within the address translation cache to the PCI device prior to the requesting when the translated address corresponding with the untranslated address is stored within the address translation cache.

11. A method for accessing data, the method comprising:
receiving, at a PCI root complex from a PCI device, a memory access request including an untranslated address; and
receiving, at the PCI root complex from the PCI device, an address translation request in a transaction that is separate from and after said memory access request, the address translation request for translating said untranslated address prior to completing a memory access corresponding to said memory access request.

12. The method according to claim 11, further comprising initiating, by the PCI root complex, an address translation in response to the receiving of said address translation request or said memory access request including said untranslated address.

13. The method according to claim 11, further comprising:
determining, by the PCI root complex, whether an address translation is already in progress for said untranslated address; and
initiating, by the PCI root complex, the address translation for said untranslated address when the address translation is not already in progress for said untranslated address.

14. The method according to claim 11, further comprising communicating, by the PCI root complex to the PCI device, a translated address that corresponds to said untranslated address in response to said address translation request.

15. The method according to claim 11, wherein
said memory access request is a read request, and
the method further comprising receiving, by the PCI root complex, data fulfilling the read request in response to said read request.

16. The method according to claim 15, further comprising communicating, by the PCI root complex to the PCI device, said received data as a response to said memory access request.

17. The method of claim 11, wherein
the PCI root complex includes an address translation cache, and
the method further comprising determining, by the PCI root complex, whether a translated address that corresponds with the untranslated address is stored within the address translation cache of the PCI root complex.

18. The method of claim 17, further comprising
providing the translated address stored within the address translation cache to the PCI device when the translated address corresponding with the untranslated address is stored within the address translation cache.

19. A system for accessing data, the system comprising:
a host memory including an address translation table; and
a PCI root complex circuit configured to
receive a memory access request from a PCI device, the memory access request including an untranslated address;
receive, from the PCI device, an address translation request in a transaction that is separate from and after said memory access request, the address transaction request for translating said untranslated address prior to completing a memory access corresponding to said memory access request;
request, from the address translation table, a translated address that corresponds to the untranslated address;
receive, from the address translation table, the translated address; and
provide, to the PCI device, the translated address in response to the address translation request.

20. The system according to claim 19, wherein the PCI root complex is further configured to
determine whether an address translation is already in progress for said untranslated address, and
initiate address translation for said untranslated address when the address translation is not already in progress for said untranslated address.

21. The system according to claim 19, wherein the PCI root complex is further configured to communicate the translated address that corresponds to said untranslated address in response to said address translation request.

22. The system according to claim 19, wherein said memory access request is a read request and the PCI root complex is further configured to receive data in response to said read request.

23. The system according to claim 19, wherein the PCI root complex is further configured to communicate said received data in response to said memory access request.

24. The system of claim 19, wherein
the PCI root complex includes an address translation cache, and
the PCI root complex is further configured to determine whether a translated address that corresponds with the untranslated address is stored within the address translation cache of the PCI root complex.

25. The system of claim 24, wherein the PCI root complex is further configured to provide the translated address stored within the address translation cache to the PCI device prior to the requesting when the translated address corresponding with the untranslated address is stored within the address translation cache.

26. A method for accessing data, the method comprising:
receiving, from a requesting device, a first direct memory access (DMA) request including an untranslated address;
receiving, from the requesting device, an address translation request to translate the untranslated address;
transmitting, by circuitry, the first DMA request to a host memory;
obtaining, by the circuitry, a translated address corresponding to the untranslated address;
sending a second DMA request including the translated address to the host memory;
providing, by the circuitry, the translated address to the requesting device; and
receiving, by the circuitry from the host memory, a second DMA response after the translated address is provided to the requesting device.

27. The method of claim 26, further comprising determining, by the circuitry, whether the translated address corresponding with the untranslated address is stored within a address translation cache of the circuitry.

28. The method according to claim 27, wherein the translated address is obtained by the circuitry from the address translation cache when the translated address corresponding with the untranslated address is stored within the address translation cache.

* * * * *

UNITED STATES PATENT AND TRADEMARK OFFICE
CERTIFICATE OF CORRECTION

PATENT NO. : 8,850,159 B2  
APPLICATION NO. : 12/111608  
DATED : September 30, 2014  
INVENTOR(S) : Jacob Carmona et al.

Page 1 of 1

It is certified that error appears in the above-identified patent and that said Letters Patent is hereby corrected as shown below:

On the title page, Item (75), the 4th Inventor's Information is incorrect. Item (75) should read:

--(75) Inventors: Jacob Carmona, Hod HaSharon (IL); Eliezer Aloni, Zur Yigal (IL); Yuval Eliyahu, Petach Tiqva (IL); Rafi Shalom, Givat Shmuel (IL)--

Signed and Sealed this  
Sixth Day of January, 2015

Michelle K. Lee  
*Deputy Director of the United States Patent and Trademark Office*